(12) United States Patent
Liang

(10) Patent No.: US 7,950,903 B1
(45) Date of Patent: May 31, 2011

(54) TURBINE BLADE WITH DUAL SERPENTINE COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 829 days.

(21) Appl. No.: 12/004,949

(22) Filed: Dec. 21, 2007

(51) Int. Cl.
*F01D 5/08* (2006.01)

(52) U.S. Cl. ..................... 416/97 R; 415/115
(58) Field of Classification Search ............... 416/96 R, 416/97 R, 96 A; 415/115
See application file for complete search history.

(56) References Cited

U.S. PATENT DOCUMENTS

| 6,431,832 | B1 * | 8/2002 | Glezer et al. | 416/97 R |
| 6,491,496 | B2 * | 12/2002 | Starkweather | 416/97 R |
| 7,104,757 | B2 * | 9/2006 | Gross | 416/97 R |
| 7,186,082 | B2 * | 3/2007 | Mongillo et al. | 416/1 |
| 7,537,431 | B1 * | 5/2009 | Liang | 416/95 |

* cited by examiner

*Primary Examiner* — Edward Look
*Assistant Examiner* — Dwayne J White
(74) *Attorney, Agent, or Firm* — John Ryznic

(57) ABSTRACT

A turbine blade with a dual serpentine flow cooling circuit to provide cooling to the airfoil section and to the blade tip section. An aft flowing multiple pass serpentine circuit includes a first leg located adjacent to the leading edge region of the blade and is connected to a leading edge impingement cavity through a row of impingement holes. A showerhead arrangement is connected to the impingement cavity to provide film cooling to the leading edge of the blade. A second aft flowing serpentine circuit is located in the tip region and is connected to the impingement cavity to supply the cooling air to the second serpentine. A row of impingement holes and exit cooling slots is arranged along the trailing edge region and connected to the first serpentine. A trailing edge discharge hole is located in the tip region to discharge cooling air from the second serpentine. The second serpentine includes film cooling holes on the pressure side to discharge film cooling air. The first serpentine includes film cooling holes on the pressure side and the suction side to provide film cooling to selected areas of the pressure and the suction side walls.

19 Claims, 5 Drawing Sheets

Typical 1st Blade External Pressure Profile

TURBINE BLADE WITH DUAL SERPENTINE COOLING

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine blade.

2. Description of the Related Art Including Information Disclosed Under 37 CFR 1.97 and 1.98

In a gas turbine engine, compressed air from a compressor is burned with a fuel in a combustor to produce a hot gas flow that is then passed through a turbine to produce mechanical energy by rotating the rotor shaft. In an aero engine, the rotor shaft drives the compressor and a bypass fan to power the aircraft. In an industrial gas turbine (IGT) engine, the rotor shaft drives an electric generator to produce electrical energy.

The efficiency of the engine can be increased by passing a higher temperature gas flow into the turbine. However, the highest temperature for which the turbine can be operated is dependent upon the material characteristics of the turbine parts, especially the first stage rotor blades and stator vanes or guides. These parts are exposed to the highest temperature flow from the combustor.

To allow for higher temperatures beyond the material properties of the turbine blades and vanes, these airfoils make use of complex internal cooling circuitry that provides a combination of convection cooling as well as impingement and film cooling of the inner airfoil surfaces and the outer airfoil surface. Modern airfoil cooling circuitry can allow for the operation of an airfoil under a temperature that exceeds the material melting temperature.

Cooling air for use in the airfoils is compressed air bled off from the compressor, and therefore the work used in compressing the cooling air for the airfoils is lost energy. Thus, the efficiency of the engine can also be increased by using less compressed air to cool the airfoils. The airfoil designer typically tries to maximize the cooling capability of the cooling air while also minimizing the amount of cooling air used in order to produce the highest level of efficiency increase.

FIG. 1 shows a prior art first stage turbine blade external pressure profile. As shown, the forward region of the pressure side surface experiences a high hot gas static pressure while the entire suction side of the airfoil is at a much lower hot gas static pressure than the pressure side. FIG. 2 shows a prior art turbine blade with a (1+5+1) forward flowing serpentine cooling circuit for the first stage blade. The flow path for the 5-pass serpentine flow circuit is shown in FIG. 3. For a forward flowing 5-pass serpentine cooling circuit used in the airfoil mid-chord region, the cooling air flows toward the leading edge and discharges into the high hot gas side pressure section of the pressure side represented by the dashed line in FIG. 1. In order to satisfy the backflow margin criteria, a high cooling supply pressure is needed for this particular design, and thus inducing a high leakage flow. In other words, the first leg of the 5-pass serpentine circuit has the highest pressure, and subsequent legs have a reduced pressure due to the travel of the cooling air through the passages. The last leg (fifth leg) in the serpentine circuit will therefore have the lowest pressure. The last leg in the FIG. 2 prior art circuit is also located at the highest external gas flow pressure. Thus, in order to prevent the hot gas flow from ingesting into the airfoil, the pressure in the last leg of the serpentine must be higher than the external gas flow pressure at the last leg. The inlet pressure for the 5-pass serpentine flow circuit must therefore be increased higher in order to prevent this from occurring.

In this particular cooling circuit, the blade tip section is cooled with double tip turns in conjunction with local film cooling. Cooling air bled off from the 5-pass serpentine flow circuit thus reduces the cooling performance for the serpentine flow circuit. Independent cooling flow circuit is used to provide cooling for the airfoil leading and trailing edge.

As TBC (thermal barrier coating) technology improves, more industrial turbine blades are applied with thick or low conductivity TBC. Cooling flow demand is reduced as a result of improved TBC protection. As a result, there is not sufficient cooling flow for the design with the prior art 1+5+1 forward flowing serpentine circuit of FIGS. 2 and 3. cooling flow for the blade leading and trailing edges has to be combined with the mid-chord flow circuit to form a single 5-pass flow circuit. However, for the forward 5-pass flow circuit with total blade cooling flow, BFM (back flow margin) may become a design issue.

BRIEF SUMMARY OF THE INVENTION

It is therefore an object of the present invention to provide for a dual serpentine flow cooling circuit in a blade with improved cooling capability over the cited prior art blade cooling circuit design.

It is another object of the present invention to provide dual serpentine flow cooling circuit in a blade coated with a TBC that has low cooling flow.

It is another object of the present invention to provide serpentine flow cooling circuit in a blade in which the gill holes on the leading edge region are not needed.

The present invention is a turbine blade with an aft flowing 5-pass serpentine flow cooling circuit used in the blade airfoil main body in parallel with a 5-pass aft flowing serpentine flow circuit for the blade tip section. The total blade cooling air flow is fed through the blade leading edge section and then flows aft toward the trailing edge for the airfoil main body aft flowing serpentine. Cooling air is bled off from the first leg of the 5-pass serpentine flow circuit to provide leading edge backside impingement cooling. Spent cooling air is then discharged through the leading edge showerhead film cooling holes to form a film cooling layer for the cooling of blade leading edge where the heat load is the highest on the entire airfoil. A portion of the spent cooling air from the leading edge impingement cavity is then channeled into a chordwise 5-pass serpentine flow network inline with the blade tip section for the cooling of the blade tip.

DETAILED DESCRIPTION OF THE INVENTION

Figure 1:
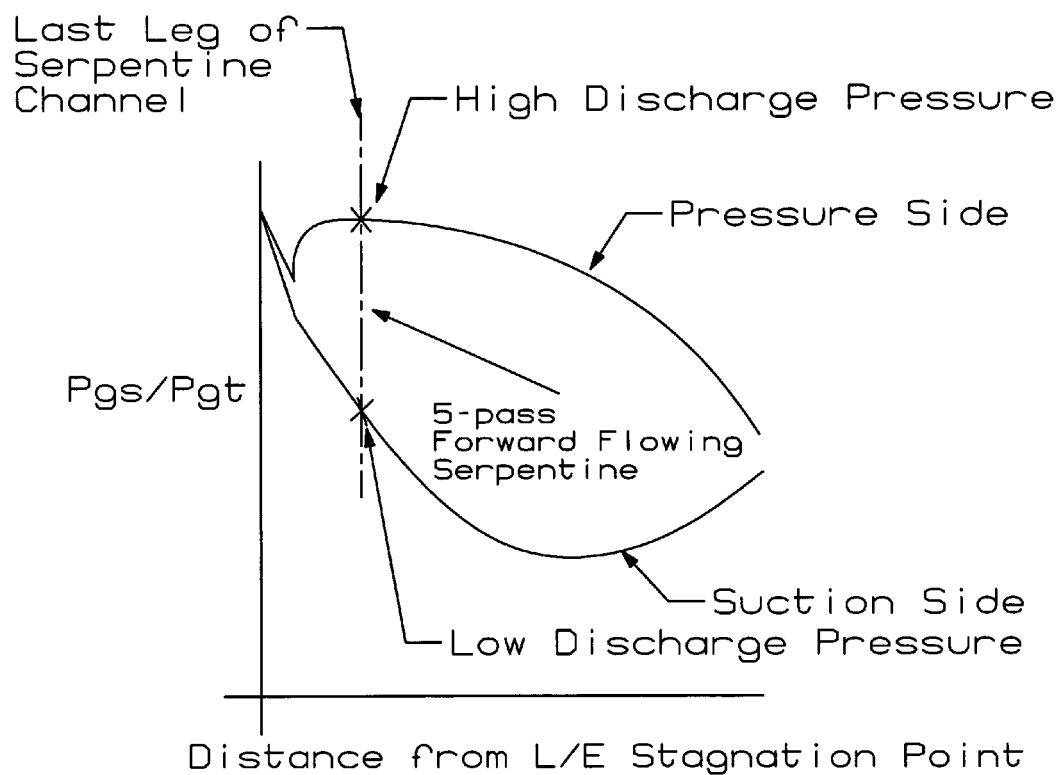
FIG. 1 shows the external pressure profile for a first stage turbine blade.
Figure 2:
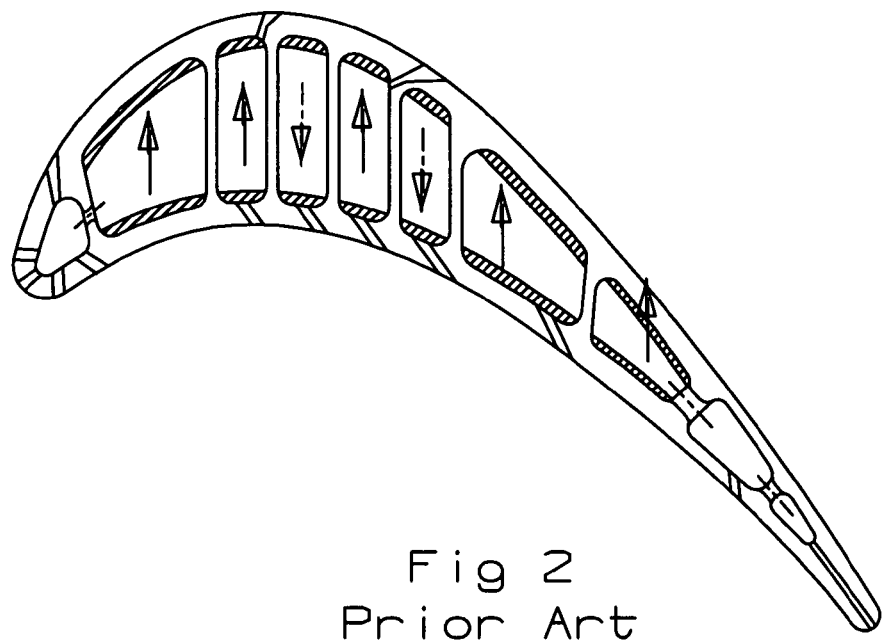
FIG. 2 shows a cross section top view of a prior art turbine blade 5-pass serpentine flow cooling circuit.
Figure 3:
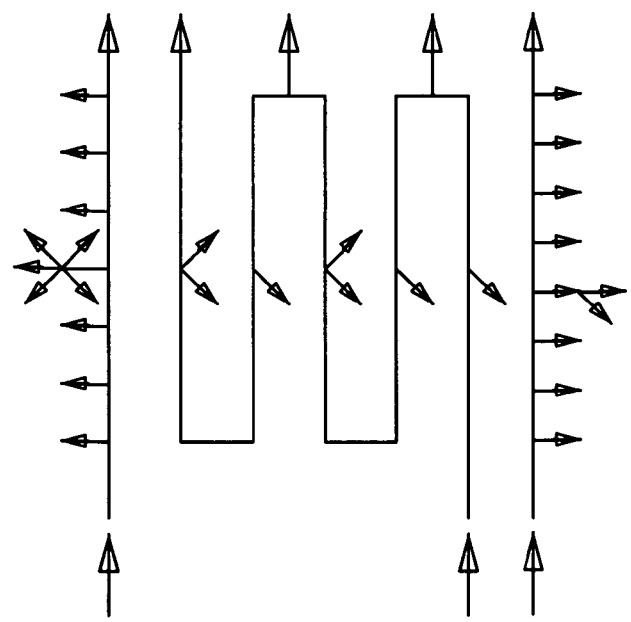
FIG. 3 shows a diagram view of the prior art turbine blade 5-pass serpentine flow cooling circuit of FIG. 2.
Figure 4:
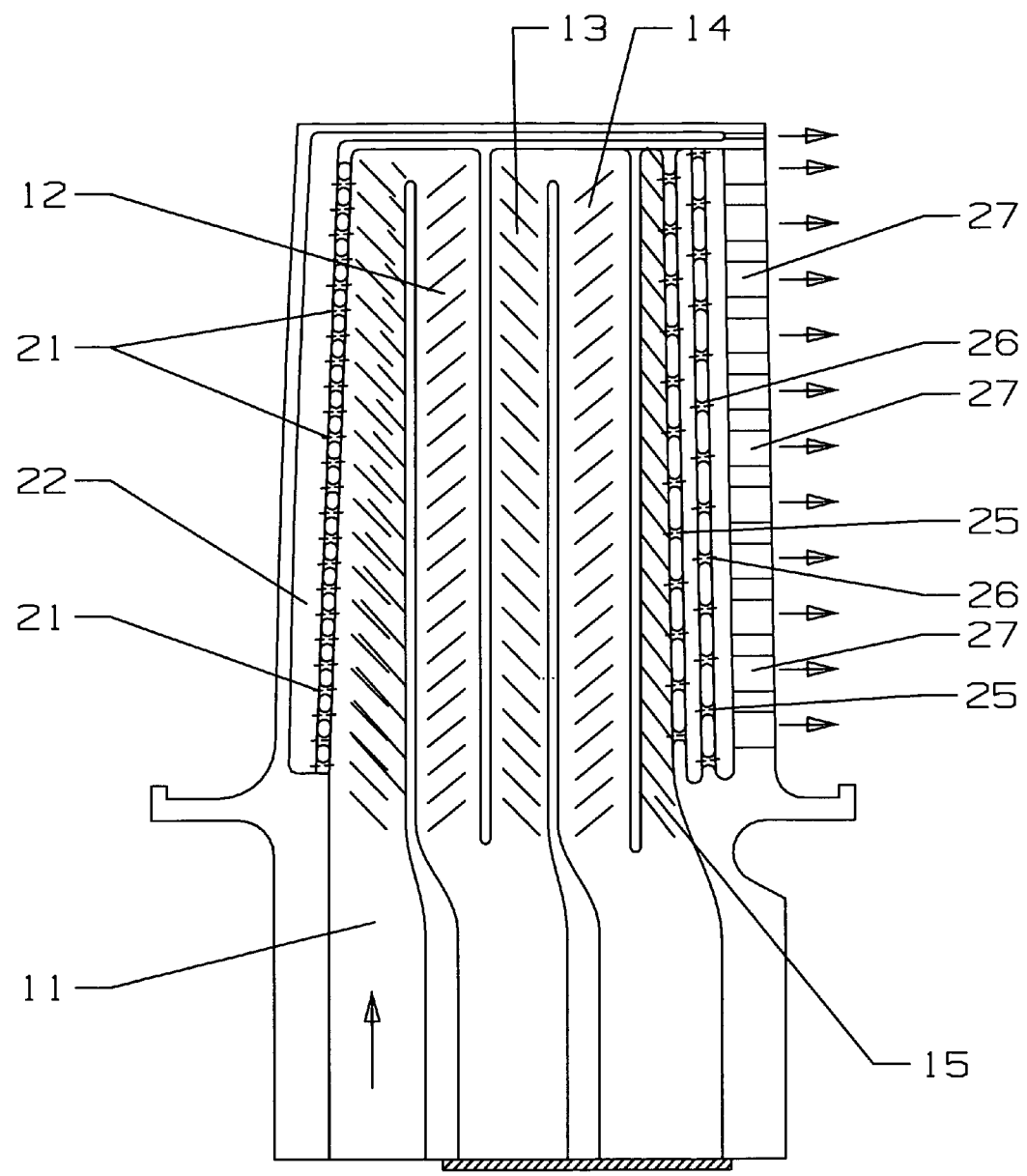
FIG. 4 shows a cross section side view of the serpentine flow cooling circuit of the present invention.

The present invention is a turbine blade with a serpentine flow cooling circuit that provides more cooling while using less cooling air flow than the prior art circuit. FIG. 4 shows a first stage turbine blade with the mid-chord aft flowing 5-pass serpentine flow cooling circuit of the present invention. The first leg 11 of the serpentine circuit is located in the leading edge region of the blade and flows upward toward the blade tip. The second leg 12 flows from the tip region and toward the blade root. The third leg 13, the fourth leg 14 and the fifth leg 15 continues in the serpentine path along the entire blade mid-chord region with the fifth leg 15 positioned at the beginning of the trailing edge region. Trip strips are included along the serpentine path in each of the five legs to promote turbulent cooling air flow and therefore improve the heat transfer coefficient from the metal to the cooling air.

Figure 5:
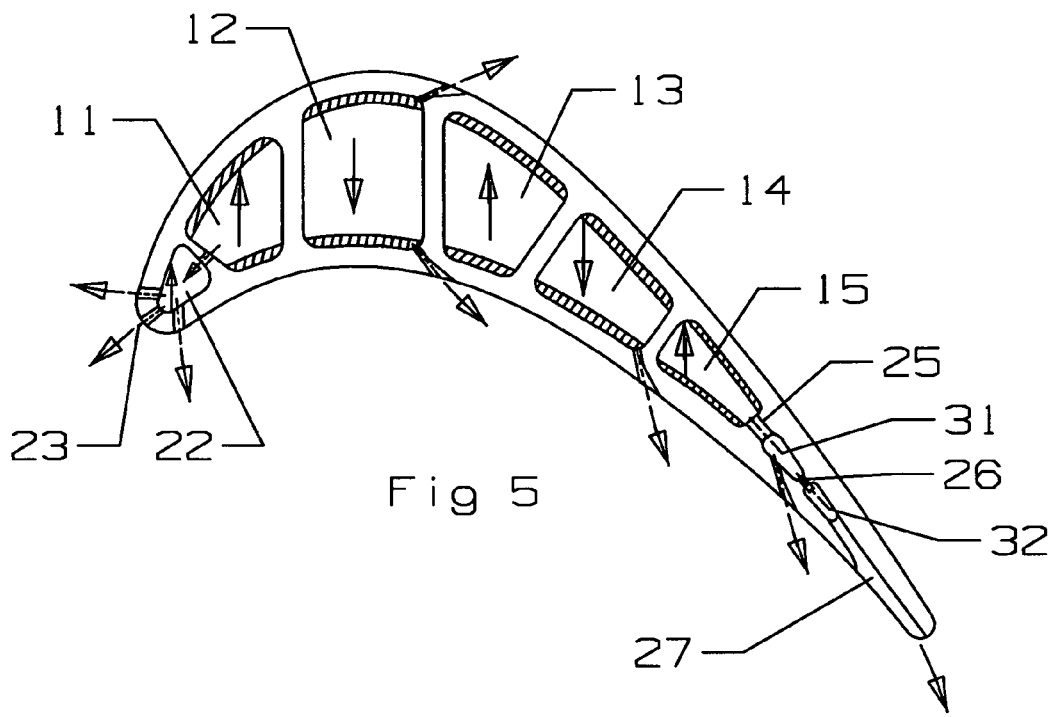
FIG. 5 shows a cross section top view of 5-pass serpentine flow cooling circuit in the blade of the present invention.
Figure 6:
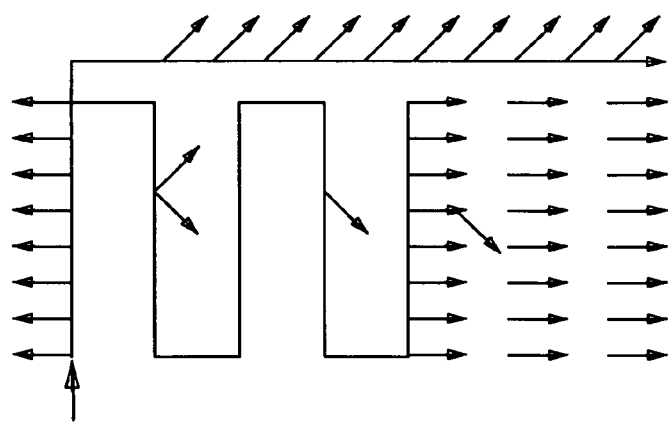
FIG. 6 shows a diagram view of the aft flowing 5-pass serpentine flow circuit of the present invention.

The first leg of the mid-chord 5-pass serpentine circuit is also connected through a row of impingement holes to a leading edge impingement cavity that extends along the entire leading edge of the airfoil. At the trailing edge region, the fifth leg 15 is connected through a first row of impingement holes 25 and a second row of impingement holes 26 to a row of trailing edge cooling slots 27. Instead of exit slots 27, a row of exit holes can be used to discharge the cooling air out from the airfoil. FIG. 5 shows a top view of a cross section of the airfoil cooling circuit of the present invention. Leading edge film cooling holes 23 are connected to the leading edge impingement cavity 22. Also, film cooling holes are connected to second and the fourth legs of the mid-chord 5-pass serpentine circuit to discharge film cooling air onto the pressure side or the suction side walls of the airfoil. A first impingement channel 31 is located downstream from the first impingement holes 25, and a second impingement channel 32 is located downstream from the second impingement hole 26. The trailing edge exit slot 27 is shown on the pressure side of the trailing edge region of the airfoil. FIG. 6 shows a flow diagram of the cooling circuit of the present invention with the mid-chord 5-pass serpentine and the 5-pass serpentine circuit on the blade tip. The arrows represent cooling air discharged through either film holes or exit slots.

Figure 7:
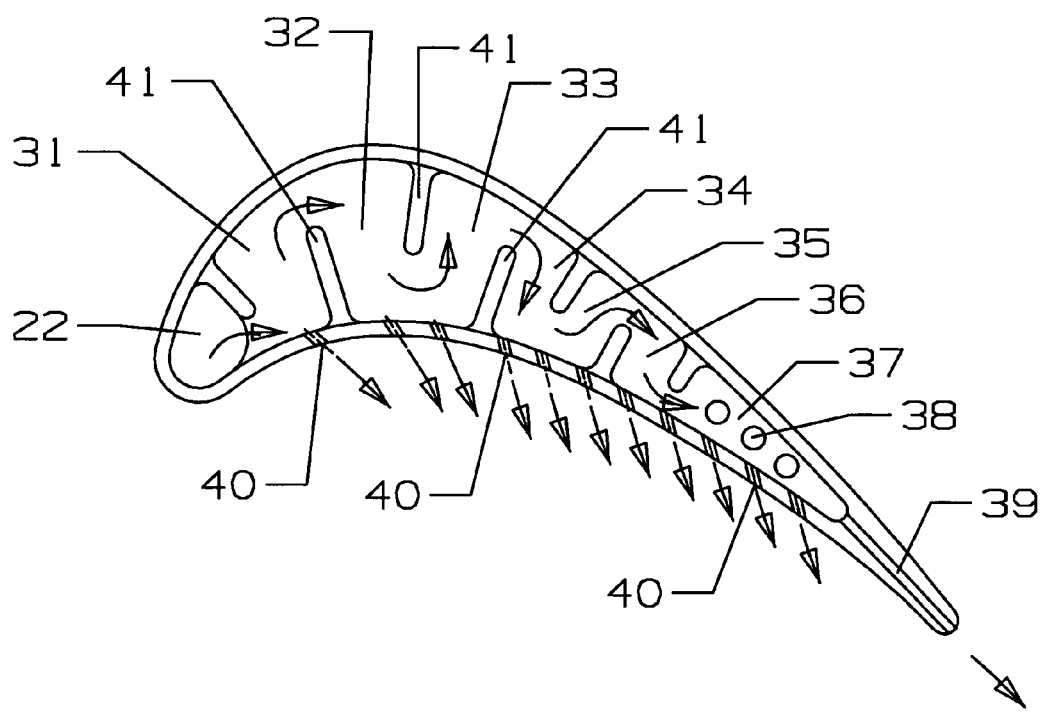
FIG. 7 shows a cross section top view of the serpentine flow cooling circuit of the blade tip for the present invention.

FIG. 7 shows the 5-pass serpentine flow circuit used in the blade tip. the tip serpentine circuit is formed by a series of ribs 41 that extend from one of the walls of the airfoil ending before the opposite wall. The leading edge impingement cavity 22 is located forward of the tip serpentine circuit and supplies the cooling air. The tip serpentine flow circuit extends from the leading edge impingement cavity 22, serpentine around the alternating ribs 41 and discharges into the trailing edge tip channel 37 in which a row of pin fins 38 extends in the blade spanwise direction. A trailing edge discharge hole 39 connects the trailing edge tip channel 37 to discharge cooling air. Film cooling holes 40 are located along the pressure side wall of the tip and connect the tip serpentine flow circuit to the external wall surface.

The dual serpentine flow cooling circuit of the present invention operates as follows. Pressurized cooling air is supplied to the blade through the first leg 11 of the mid-chord 5-pass serpentine flow circuit. Some of this cooling air is bled off through the impingement holes 21 to provide backside impingement cooling of the leading edge airfoil wall. The pressurized cooling air not bled off continues to flow over the tip region and into the second leg 12 downward substantially parallel to the first leg 11 flow. The cooling air flows through the third leg 13, the fourth leg 14 and then into the fifth leg 15. As seen in FIG. 5, the cooling air flowing through the second leg 12 will have some cooling air bled off through a row of pressure side film holes and a row of suction side film holes to provide a layer of film cooling air to the two walls of the airfoil. the fourth leg 14 includes a row of pressure side film cooling holes to discharge some of the cooling air onto the pressure side wall. the remaining mid-chord 5-pass serpentine flow cooling air then flows up into the fifth leg 15 where the cooling air is progressively bled off into a first row of impingement holes 25 and then through a second row of impingement holes 26 and into trailing edge cooling slots 27 to be discharged out through the trailing edge region of the airfoil.

The cooling air that is bled off from the first leg 11 and flows through the leading edge impingement holes 21 impinges onto the backside of the leading edge wall in the leading edge impingement cavity 22. As seen in FIG. 5, some of the cooling air impinged into the leading edge impingement cavity 22 will flow through a showerhead arrangement of film holes 23 extending along the airfoil and around the leading edge region from the pressure side to the suction side to provide film cooling for the leading edge region. The cooling air that flows into the impingement cavity 22 that does not flow through the showerhead holes will flow up to the tip and into the 5-pass tip serpentine flow circuit as seen in FIG. 7. The cooling air from the impingement cavity 22 flows toward the trailing edge in a serpentine path between the alternating ribs 41 extending from the pressure side wall and the suction side wall. Film holes 40 located along the pressure side wall in the tip region will discharge film cooling air from the tip serpentine flow circuit to provide film cooling for this region of the blade. The remaining tip serpentine flow cooling air will pass around the pin fins 38 and then be discharge out through the trailing edge exit hole 39 to provide cooling for the trailing edge region.

As shown in FIG. 7, the tip serpentine flow circuit has six turns from the leading edge impingement cavity 22 until the trailing edge tip channel 37 with the pin fins 38. however, the tip serpentine flow circuit can have less than six or more than six depending upon the inlet pressure, heat transfer requirements, film cooling discharge amount, and other design parameters that should be addressed when designing the tip serpentine flow circuit.

Major design features and advantages of the cooling circuit of the present invention over the cited prior art 5-pass forward flowing serpentine circuit as described below. Minimize the blade BFM issue.

The blade total cooling air is fed through the airfoil forward section and flows toward the trailing edge and thus will maximize the use of cooling pressure potential.

Higher cooling mass flow through the airfoil main body yields lower mass average blade metal temperature which translates into a higher stress rupture life for the blade.

Blade total cooling flow is fed through the airfoil pressure side forward section where the external gas side heat low is low. Since the cooling air temperature is fresh, as a result of this cooling air feed system, the use of cooling air potential to achieve a non-film cooling zone for the airfoil is maximized. Elimination of leading edge pressure side and suction side gill holes also becomes feasible.

Other features and advantages include the following. Tip section cooling is used for the blade leading edge backside impingement first. This double use of cooling air will maximize the blade cooling effectiveness. In addition, the combined tip section cooling air into the leading edge impingement will enhance the backside impingement effectiveness as well as enlarge the impingement cross-over hole size for better casting yields.

All the high heat transfer in the serpentine turns for the 5-pass chordwise tip serpentine occurs along the blade pressure and suction peripheral which enhances blade tip section convective cooling. Also, the tip turns for the airfoil main body also provides additional tip section cooling. As a result of the cooling design, a double cooling for the blade tip section is created and yields a better cooling for the blade tip. Film cooling may also be incorporated at the aft portion of the tip 5-pass chordwise flow circuit.

The aft flowing 5-pass cooling flow mechanism maximizes the use of cooling air and provides a very high overall cooling efficiency for the entire airfoil.

The aft flowing serpentine cooling flow circuit used for the airfoil main body will maximize the use of cooling to main stream gas side pressure potential. Portion of the air is discharged at the aft section of the airfoil where the gas side pressure is low and thus yields a high cooling air to main stream pressure potential to be used for the serpentine channels and maximize the internal cooling performance for the serpentine.

The aft flowing main body 5-pass serpentine flow channel yields a lower cooling supply pressure requirement and a lower leakage.

I claim the following:

1. An air cooled turbine airfoil comprising:
an airfoil having a leading edge and a trailing edge, and a pressure side wall and a suction side wall;
a root portion extending from the airfoil;
a tip region formed on an end of the airfoil opposite from the root portion;
a first multiple pass serpentine flow cooling circuit formed within the airfoil, the multiple pass serpentine flow cooling circuit having a first leg located adjacent to the leading edge region of the airfoil;
an impingement cavity located along the leading edge wall of the airfoil;
a plurality of impingement holes connecting the impingement cavity to the first leg of the multiple pass serpentine flow cooling circuit directed to discharge impingement cooling air onto a backside surface of the leading edge wall;
a second multiple pass serpentine flow cooling circuit formed in the tip region and extending from the leading edge region to the trailing edge region; and,
the first leg of the second multiple pass serpentine flow cooling circuit connected to the impingement cavity such that cooling air flows from the impingement cavity and into the first leg of the second multiple pass serpentine flow cooling circuit.

2. The air cooled turbine airfoil of claim 1, and further comprising:
a showerhead arrangement of film cooling holes in the leading edge region of the airfoil, the showerhead holes being connected to the impingement cavity.

3. The air cooled turbine airfoil of claim 1, and further comprising:
the second multiple pass serpentine flow cooling circuit includes film cooling holes on the pressure side of the tip region to discharge film cooling air from the second multiple pass serpentine flow cooling circuit onto the pressure side tip region of the airfoil.

4. The air cooled turbine airfoil of claim 1, and further comprising:
the tip region includes a trailing edge channel connected to the last leg of the second multiple pass serpentine flow cooling circuit with pin fins located in the channel.

5. The air cooled turbine airfoil of claim 1, and further comprising:
a trailing edge discharge hole connected to the second multiple pass serpentine flow cooling circuit to discharge cooling air out from the trailing edge of the airfoil.

6. The air cooled turbine airfoil of claim 1, and further comprising:
the first serpentine flow cooling circuit is a 5-pass serpentine flow circuit with the fifth leg located adjacent to the trailing edge region of the airfoil;
at least one row of impingement holes; and,
a row of trailing edge cooling slots; wherein cooling air from the fifth leg flows through the impingement holes and then through the cooling slots.

7. The air cooled turbine airfoil of claim 6, and further comprising:
the second leg of the first serpentine flow cooling circuit includes pressure side and suction side film cooling holes; and,
the fourth leg of the first serpentine flow cooling circuit includes pressure side film cooling holes to discharge film cooling air from the leg onto the airfoil wall.

8. The air cooled turbine airfoil of claim 1, and further comprising:
the second serpentine flow cooling circuit is at least a 5-pass serpentine flow circuit.

9. The air cooled turbine airfoil of claim 1, and further comprising:
the first and the second serpentine flow cooling circuits include legs that extend from the pressure side wall to the suction side wall.

10. The air cooled turbine airfoil of claim 1, and further comprising:
A showerhead arrangement of film cooling holes connected to the impingement cavity.

11. An air cooled turbine airfoil comprising:
an airfoil having a leading edge and a trailing edge, and a pressure side wall and a suction side wall;
a root portion extending from the airfoil;
a tip region formed on an end of the airfoil opposite from the root portion;
a first aft flowing multiple pass serpentine flow cooling circuit formed within the mid-chord region of the airfoil;
a second aft flowing multiple pass serpentine flow cooling circuit formed within the tip region of the airfoil;
an impingement cavity formed within the leading edge of the airfoil;
a plurality of impingement cooling holes connecting the first aft flowing multiple pass serpentine flow cooling circuit to the impingement cavity directed to discharge impingement cooling air onto a backside surface of the leading edge wall; and,
the second aft flowing multiple pass serpentine flow cooling circuit connected to the impingement cavity and extends to the trailing edge region of the blade tip.

12. The air cooled turbine airfoil of claim 11, and further comprising:
the second aft flowing multiple pass serpentine flow cooling circuit includes film cooling holes on the pressure side of the tip region to discharge film cooling air from the second multiple pass serpentine flow cooling circuit onto the pressure side tip region of the airfoil.

13. The air cooled turbine airfoil of claim 11, and further comprising:
a showerhead arrangement of film cooling holes in the leading edge region of the airfoil, the showerhead holes being connected to the impingement cavity.

14. The air cooled turbine airfoil of claim 11, and further comprising:
the first aft flowing multiple pass serpentine flow cooling circuit is located below the tip such that cooling air flowing around the turns adjacent to the tip provides cooling for the tip.

15. The air cooled turbine airfoil of claim 11, and further comprising:
a row of trailing edge cooling slots connected to the first aft flowing multiple pass serpentine flow cooling circuit to discharge cooling air from the first serpentine; and,
a trailing edge discharge hole connected to the second aft flowing multiple pass serpentine flow cooling circuit to discharge cooling air from the second serpentine.

16. A process for cooling a turbine airfoil comprising the steps of:
supplying pressurized cooling air to a leading edge region of the airfoil;
passing a majority of the supplied pressurized cooling air through an aft flowing serpentine circuit through the mid-chord region of the airfoil;
bleeding off a portion of the pressurized cooling air from the aft flowing serpentine circuit and impinging the cooling air against the backside of the leading edge airfoil surface;
discharging a portion of the impinging cooling air out through film cooling holes onto the leading edge of the airfoil; and,
passing the remaining impinging cooling air through the tip region in a serpentine flow circuit from the leading edge region to the trailing edge region to cool the tip region.

17. The process for cooling a turbine airfoil of claim 16, and further comprising the step of:
discharging some of the tip cooling air from the serpentine circuit through pressure side film holes to provide film cooling to the tip region on the pressure side.

18. The process for cooling a turbine airfoil of claim 16, and further comprising the step of:
discharging the serpentine flow cooling air from the mid-chord airfoil through a row of exit cooling slots in the trailing edge region to provide cooling for the trailing edge.

19. The process for cooling a turbine airfoil of claim 16, and further comprising the step of:
discharging film cooling air onto the pressure side and the suction side walls from the mid-chord serpentine flow cooling circuit to provide film cooling for the airfoil walls.

* * * * *